Patented Feb. 4, 1947

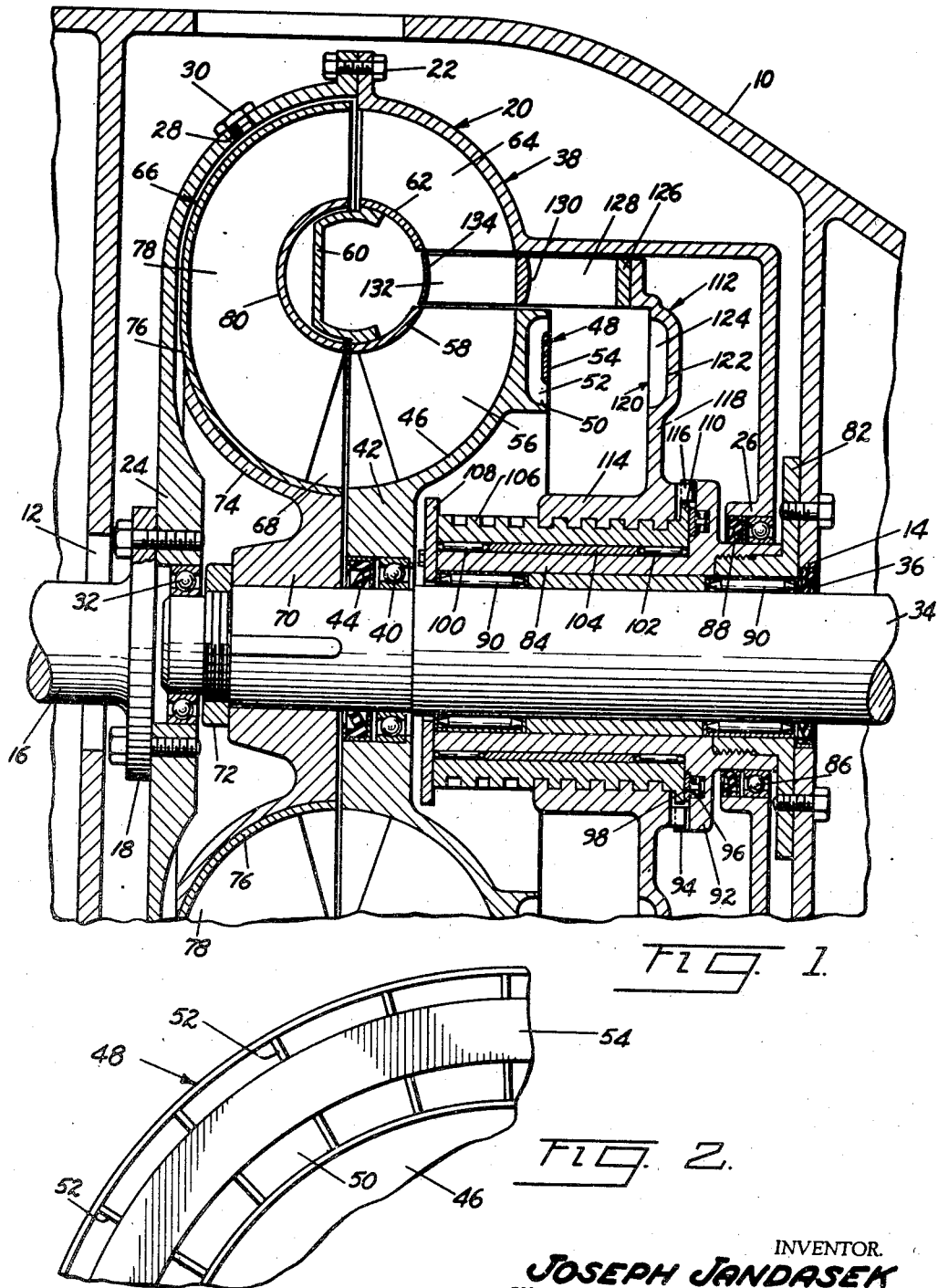

2,415,287

UNITED STATES PATENT OFFICE 2,415,287

TORQUE CONVERTER WITH FLUID CLUTCH CONNECTING AXIALLY SHIFTABLE REACTION MEMBER TO IMPELLER DURING COUPLING OPERATION

Joseph Jandasek, Detroit, Mich., assignor to Bendix Aviation Corporation, Detroit, Mich., a corporation of Delaware Application July 28, 1941, Serial No. 404,416

7 Claims. (Cl. 60—54)

This invention relates to fluid transmissions, and more particularly to that type known as fluid drives.

Broadly the invention comprehends a fluid drive including an impeller, a turbine associated therewith, and a reaction member cooperating with the impeller and turbine.

An object of the invention is to provide a fluid drive including an impeller and a turbine providing in conjunction with one another a fluid circuit, and a reaction member automatically movable into and out of the fluid circuit.

Another object of the invention is to provide a fluid clutch operative to yieldingly hold the reaction member and the impeller together when the vanes of the reaction member are moved out of the fluid circuit.

Another object of the invention is to provide a fluid drive including an impeller, a turbine, and a reaction member operative to function as an auxiliary impeller during high speeds of rotation of the impeller.

Yet another object of the invention is to provide a fluid torque converter including an impeller, a turbine associated therewith, and a reaction member for cooperation with the impeller and turbine operative to function as an auxiliary impeller at high speeds of rotation and as a guide for the fluid flow at low speeds of rotation.

Other objects and advantages of the invention will appear from the following description taken in connection with the drawings forming a part of this specification, and in which—

Fig. 1 is a vertical sectional view of a fluid drive embodying the invention;

Fig. 2 is a fragmentary view illustrating a fluid clutch for locking the impeller and reaction member together.

Figure 3:
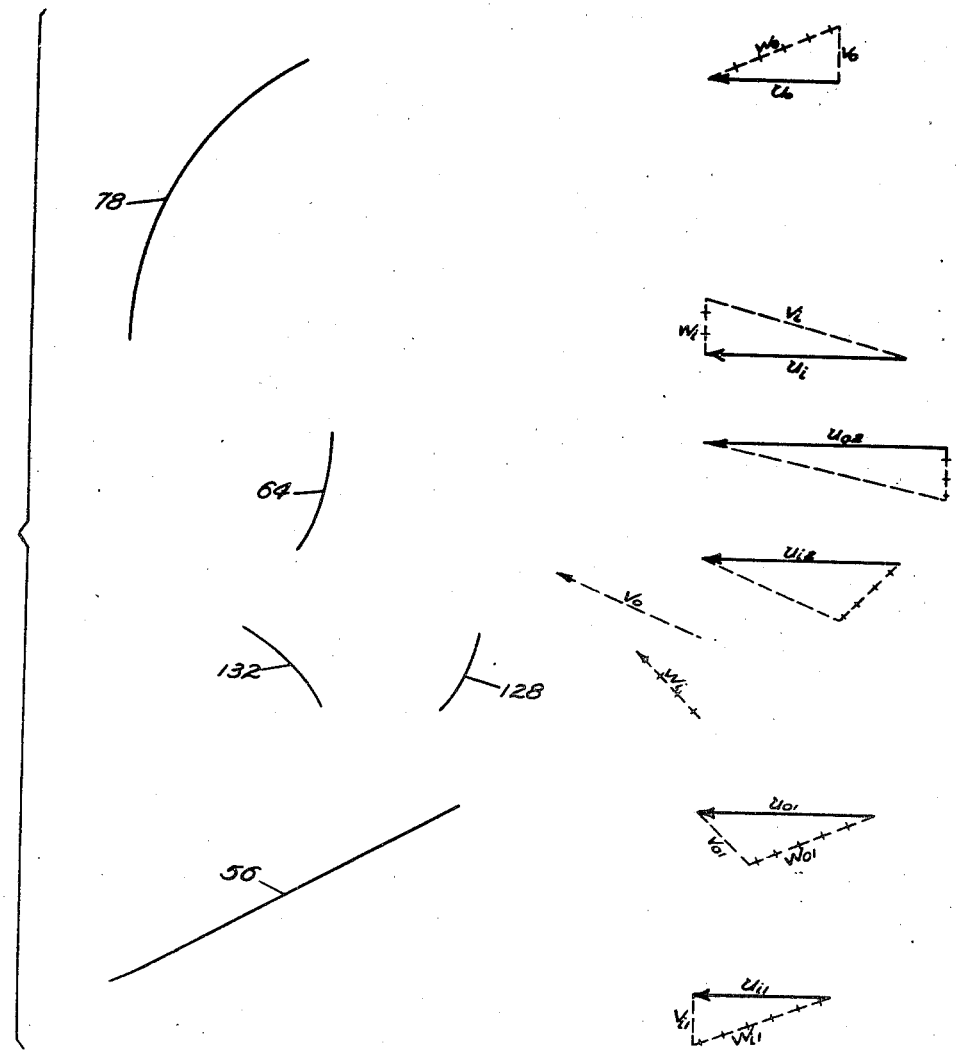
Fig. 3 is a diagrammatic view of the respective blades and vanes and corresponding vectors.

Referring to the drawings for more specific details of the invention, 10 represents a stationary housing having concentrically disposed openings 12 and 14 arranged in oppositely disposed relation to one another.

A driving shaft 16 adapted to be connected to the crank shaft of an internal combustion engine or any other suitable power plant has a conventional flange 18. A rotatable housing 20, preferably made in two parts secured together as by bolts 22, has concentrically disposed hubs 24 and 26, and a filling opening 28 normally closed as by a plug 30, and the hub 24 is bolted or otherwise fixedly secured to the flange 18 of the driving shaft.

The hub 24 has fitted therein a bearing 32 supporting for rotation a driven shaft 34 extended through the opening 14 in the stationary housing, and a sealing member 36 fitted in the opening 14 embraces the driven shaft.

An impeller, indicated generally at 38 is mounted for rotation on the driven shaft 34 and fixedly secured to the housing 20 for rotation therewith. As shown, a bearing 40 fitted on the driven shaft supports for rotation a hub 42, and a fluid seal 44 fitted in the hub embraces the driven shaft. The hub supports an outer shroud 46 having on its back a fluid clutch member 48 including an annular chamber 50 having arranged therein a plurality of blades 52 supporting a shroud 54.

The outer shroud 46 has thereon the first stage of the impeller including a plurality of blades 56 supporting an inner shroud 58 and a bracket or ring 60 fixedly secured to the inner shroud 58 is in turn fixedly secured to an inner shroud 62 having thereon the second stage of the impeller including a plurality of blades 64 fixedly secured to the inner wall of the housing 20 in spaced relation to the blades 56 of the impeller.

A turbine indicated generally at 66 is mounted on the driven shaft 34 in oppositely disposed relation to the impeller, and provides in conjunction therewith a vortex chamber 68 for the circulation of fluid. The turbine includes a hub 70 splined to the driven shaft 34 and held against displacement as by a retaining ring 72 threaded on the shaft. The hub has thereon a flange 74 supporting an outer shroud 76 having thereon a plurality of vanes 78 supporting an inner shroud 80.

A bracket 82 bolted or otherwise fixedly secured to the stationary housing 10 rigidly supports a sleeve 84 extended through the hub 26 into the rotatable housing 20. A bearing 86 fitted on the sleeve supports the hub 26, and a fluid seal 88 fitted in the hub embraces the sleeve to inhibit seepage of fluid from the housing 20. The sleeve has therein bearings 90 held apart by a spacer for the reception of the driven shaft 34. This sleeve has an outwardly extended flange 92 supporting a laterally extended stop 94 and a plurality of spaced recesses having therein springs 96 supporting a friction ring 98.

Needle bearings 100 and 102 fitted on the sleeve 84 with a spacer 104 interposed support for rotation a threaded sleeve 106 held against displacement by a ring 108 bolted or otherwise secured to the sleeve 84. The threaded sleeve 106 has a flange 110 for cooperation with the friction ring 98. This is to effectively retard rotation of the threaded sleeve.

A reaction member indicated generally at 112 includes a carrier 114 mounted for travel on the threaded sleeve 106. The carrier has a laterally extended stop 116 for cooperation with the stop 94, when the reaction member is in retracted position. This carrier supports a web 118 having thereon a clutch member 120 for cooperation with the clutch member 48 on the shroud 46 of the impeller when the reaction member is in unretracted position. This clutch member 120 includes an annular channel 122 having arranged therein a plurality of blades 124 for cooperation with the blades 52 of the clutch member 48. This clutch is quite effective for holding the reaction member and the impeller together during high speeds of rotation of the impeller.

The reaction member 112 also has thereon an outer shroud 126 supporting a plurality of auxiliary impeller blades 128 having thereon an inner shroud 130 supporting a plurality of reaction vanes 132 having thereon an inner shroud 134. The auxiliary impeller blades 128 and the reaction vanes 132 move automatically into and out of the fluid circuit between the blades 56 and 64 of the impeller. As the blades 128 move out of the fluid circuit, the vanes 132 move into the circuit, and vice-versa.

In a normal operation, rotation of the driving shaft 16 results in rotation of the housing 20 and this rotation of the housing drives the impeller 38. The fluid in the vortex chamber 68 is energized by the impeller, and the energy of the fluid is absorbed by the vanes 78 of the turbine, resulting in rotation of the turbine and the consequent transmission of force through the driven shaft 34.

Upon attaining a predetermined speed of rotation of the impeller and associated turbine, the direction of flow of the fluid in the vortex chamber changes and the fluid impinges on the backs of the vanes 132. This results in automatic movement of the reaction member 112 on the threaded sleeve 106, and as the reaction member travels on the screw the reaction vanes 132 move out of the fluid circuit and the auxiliary impeller vanes 128 move into the fluid circuit, and upon completion of this movement of the reaction vanes and the auxiliary blades of the impeller the clutch members 48 and 120 cooperate with one another to effectively hold the impeller and reaction member together. This materially enhances the impeller when operating at high speed in that it provides additional blade area.

Upon decrease in speed of rotation of the turbine, the direction of the flow of fluid in the vortex chamber 68 again changes, and the fluid impinges on the backs of the blades 128. This results in movement of the reaction member 112 on the threaded screw 106, and during this movement the auxiliary blades 128 of the impeller move out of the fluid flow and the reaction vanes 132 move into the fluid flow and upon completion of this movement the stop 116 on the reaction member engages the stop 94 so as to hold the reaction member against movement in one direction. This completes the cycle.

Fig. 3 illustrates the arrangement of the blades and vanes of the impeller, the reaction member, and the turbine and their respective relation to one another and the corresponding vectors wherein—

Impeller 1:
$v_1$=absolute velocity
$w_1$=relative velocity
$u_1$=rotative velocity Reaction member:
$V^*$=absolute velocity
$W^*$=relative velocity Impeller 2:
$v_2$=absolute velocity
$w_2$=relative velocity
$u_2$=rotative velocity Turbine:
$V$=absolute velocity
$W$=relative velocity
$U$=rotative velocity Torque:
$t$=total impeller torque
$T$=turbine torque
$T^*$=reaction member torque The following formula applies to the function of the unit as illustrated in Fig. 3:

$$t+T^*=T$$
$$T^*>o$$
$$T>t$$

Impeller torque plus reaction torque equals turbine torque. Reaction torque is greater than zero. Consequently turbine torque is greater than impeller torque; hence, torque multiplication.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid transmission comprising a two-stage impeller for energizing fluid, a turbine for receiving energy from the fluid, a member movable axially of the impeller between the stages thereof including two axially spaced sets of blades, means for holding the member against rotation in one direction when one set of blades is between the stages, and means for coupling the member to the impeller when the other set of blades is between the stages.

2. A fluid transmission comprising an impeller, a turbine providing in conjunction therewith a fluid circuit, a rotatable member adapted to move axially in the circuit in two directions of travel due to changes in fluid flow, means for holding the member against rotation upon conclusion of its travel in one direction, and means for coupling the member to the impeller for rotation therewith upon conclusion of its travel in the other direction.

3. A fluid transmission comprising an impeller, a turbine providing in conjunction therewith a vortex chamber, a rotatable member adapted to move axially in the chamber in two directions of travel, means for inhibiting movement of the member upon conclusion of its travel in one direction, and a fluid clutch including cooperative elements one carried by the impeller and the other carried by the rotatable member for coupling the member to the impeller for rotation therewith upon conclusion of its travel in the other direction.

4. A fluid transmission comprising an impeller, a turbine associated therewith, a rotatable and axially movable member cooperating with the impeller and turbine, and a fluid clutch for coupling the member to the impeller including cooperative elements one on the impeller and another on the member.

5. A fluid transmission comprising an impeller, a turbine associated therewith, a rotatable and axially movable member cooperating with the impeller and turbine including a combined reaction member and auxiliary impeller, and a fluid clutch for coupling the member to the impeller when the auxiliary impeller is in direct association with the impeller and turbine.

6. A fluid transmission comprising an impeller, a turbine associated therewith, a member cooperating with the impeller and turbine including reaction vanes and auxiliary impeller blades, and a fluid clutch for coupling the impeller and the member having cooperative elements one on the impeller and the other on the member.

7. A fluid transmission comprising an impeller, an associated turbine providing in conjunction therewith a fluid circuit, a movable member for cooperation with the impeller and turbine including parallel sets of blades movable alternately into and out of the circuit, means for holding the member against rotation in one direction when one set of blades is in the circuit, and a fluid clutch for coupling the member to the impeller when the other set of blades is in the circuit.

JOSEPH JANDASEK.

REFERENCES CITED

The following references are of record in the file of this patent:

UNITED STATES PATENTS

| Number | Name | Date |
| --- | --- | --- |
| 2,173,604 | Dodge | Sept. 19, 1939 |
| 2,179,149 | Gruenberger | Nov. 7, 1939 |
| 2,194,949 | Lysholm | Mar. 26, 1940 |
| 2,205,794 | Jandasek | June 25, 1940 |
| 2,235,370 | Jandasek | Mar. 18, 1941 |
| 2,162,543 | Banner | June 13, 1939 |

FOREIGN PATENTS

| Number | Country | Date |
| --- | --- | --- |
| 439,628 | Föttinger (British) | Dec. 6, 1935 |